Patented Dec. 6, 1949

2,490,374

UNITED STATES PATENT OFFICE 2,490,374

MEANS FOR TESTING AUTOMOBILE IGNITION DISTRIBUTORS

Laurids Porse, Pasadena, Calif.

Application May 8, 1946, Serial No. 668,297

2 Claims. (Cl. 73—118)

This invention relates to a device for testing automobile ignition distributors, more particularly, for testing the speed responsive, centrifugally operated, weight assembly of an automobile ignition distributor.

In testing a conventional, centrifugally operated, weight assembly of an automobile distributor, it is customary to assemble the distributor, apply it to a testing machine, and adjust the weight springs in accordance with the results of the test. To adjust the springs, it is necessary to disassemble the distributor sufficiently to permit access to the weights and springs.

It is an object of this invention to provide a testing device by the use of which complete assembly of a distributor prior to testing its weight assembly may be obviated.

It is another object of this invention to provide a testing device for holding a cam actuable member in operative relation with the cam member of a distributor, while still permitting access to the interior of the distributor housing, wherein is situated the distributor weight assembly.

It is another object of this invention to provide such a testing device having quick attachable and detachable means for supporting it in fixed relation to the distributor housing.

It is another object of this invention to provide a structure, having a cam actuable member thereon, which may be inserted in a distributor housing, while still permitting access to the interior of the housing for adjustment of the distributor weight assembly.

It is another object of this invention to provide an improved method of testing the weight assembly of an automobile distributor through the elimination of certain time-consuming steps previously required.

This invention possesses many other advantages and has other objects which may be made more easily apparent from a consideration of one embodiment of the invention. For this purpose there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

Figure 1 is a perspective view of a testing device such as is contemplated by the present invention;

Figure 2 is a cross-sectional elevation of a distributor housing with the device of Figure 1 applied thereto; and Figure 3 is a plan view of the distributor housing of Figure 2 showing a cam actuable member mounted on the testing device of Figure 1.

The instant testing device comprises a structure adapted to be held, by quick-actuable securing means, to a distributor housing. Means are provided on the structure for receiving a cam actuable member, such as a conventional automobile circuit breaker, or "point assembly." The structure is so shaped that working access is permitted to the interior of the distributor housing, thereby making possible adjustment of the distributor weight assembly without removing the circuit breaker from operating relation with respect to the distributor cam member.

Referring to Figure 1 of the drawing, the testing device, as shown, comprises a substantially flat plate 10 in the form of a disc sector having an arc of substantially less than 360°. That is to say, an appreciable sector of the circle bounding the disc has been removed, as shown at 11, leaving the disc sector 10 of approximately 200° of arc. The disc sector 10 is preferably fabricated of a resilient material, such as sheet steel, and is provided around its edge with three spaced arms 12, 13 and 14, extending from the edge of the sector 10 in a direction normal to the plane thereof. The arms are preferably fabricated integral with sector 10, being cut from the same sheet of material. At its end, each arm 12, 13, and 14 is bent outwardly to form a hook, as shown at 15, 16, and 17, respectively. A hole 18 is provided in the center of disc sector 10 to permit passage of a distributor cam member. A post 19, mounted on the sector 10, serves, with the screw 20 threaded into sector 10, to provide mounting means for a conventional circuit breaker.

The application of the device of Figure 1 to a conventional distributor housing (assumed, in this example, to be of the Delco-Remy type) is shown in Figures 2 and 3, wherein 21 represents the distributor housing, the upper portion thereof terminating in rim 22. Distributors of this type usually include a breaker plate (not shown), supporting the breaker mechanism and associated apparatus, and mounted in the housing 21 for angular movement about the axis of the cam shaft 28 by means responsive to variations of the vacuum in the engine intake manifold. For this purpose the breaker plate is generally supported by several small balls accommodated in a groove 35 in the housing. The disc sector 10 is intended housing in lieu of said breaker plate; means for detachably securing said member in place, including a plurality of upwardly directed arms, angularly spaced about the periphery of said member, each of said arms having at its upper end, a hook for engaging the rim of said housing; and means for mounting a breaker mechanism on said member, said member having an angular extent substantially less than 360°, whereby to provide an access opening into the housing below the member.

LAURIDS PORSE.

REFERENCES CITED

The following references are of record in the file of this patent:

UNITED STATES PATENTS

| Number | Name | Date |
|---|---|---|
| 1,989,629 | Schneider et al. | Jan. 29, 1935 |
| 2,066,111 | Hughes | Dec. 29, 1936 |

Dec. 6, 1949   F. L. RUPLEY   2,490,375
PNEUMATIC BORE GAUGING HEAD
Filed Aug. 29, 1946   2 Sheets-Sheet 1
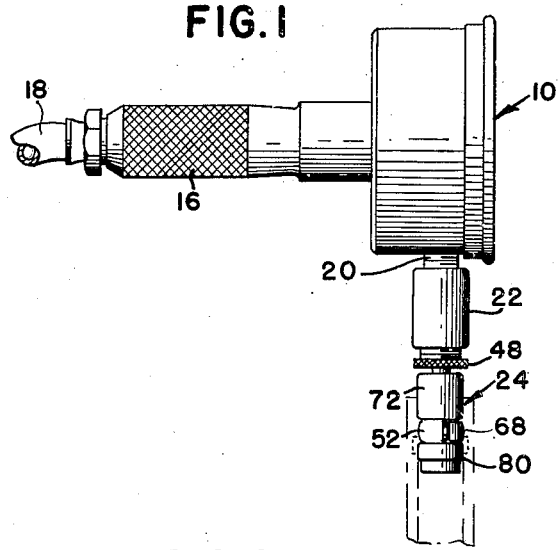
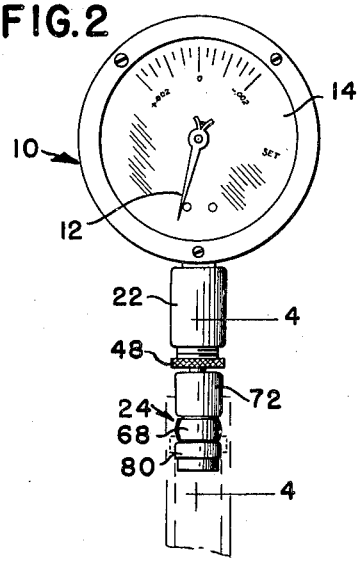
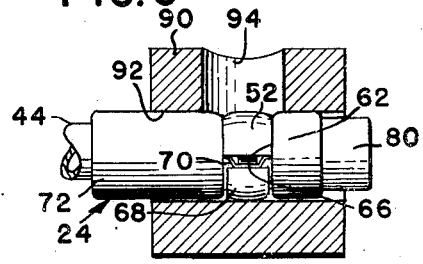
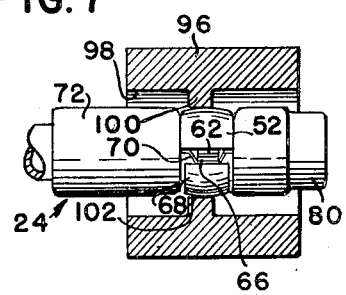
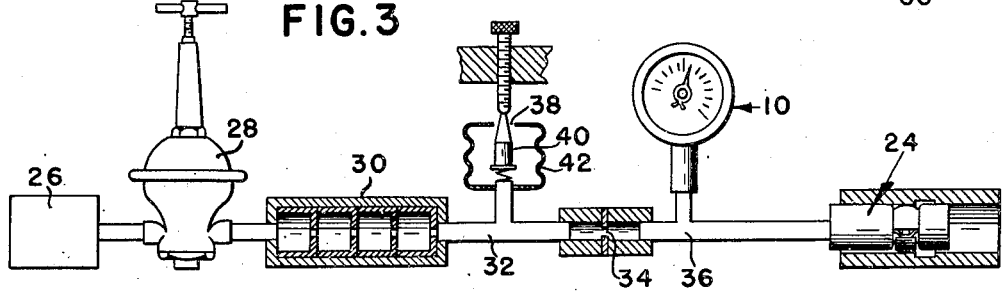
INVENTOR
FREDERICK L. RUPLEY
BY
Toulmin & Toulmin
ATTORNEY